United States Patent [19]

Aylen et al.

[11] Patent Number: 5,782,951
[45] Date of Patent: Jul. 21, 1998

[54] PARTICULATE UREA WITH FINELY DIVIDED INORGANIC MATERIAL INCORPORATED FOR HARDNESS NONFRIABILITY AND ANTI-CAKING

[75] Inventors: Peter B. Aylen, Kamloops; James C. Blyth, Cochrane, both of Canada

[73] Assignee: Western Industrial Clay Products, Inc., Kamloops, Canada

[21] Appl. No.: 803,501

[22] Filed: Feb. 20, 1997

[51] Int. Cl.$^6$ .................................................. C05C 9/00
[52] U.S. Cl. .................... 71/28; 71/29; 71/30; 71/64.12; 71/64.13
[58] Field of Search .......................... 71/28–30, 64.07, 71/64.11, 64.12, 64.13

[56] References Cited

U.S. PATENT DOCUMENTS 5,676,729  10/1997  Elrod et al. ................................. 71/28

OTHER PUBLICATIONS

Haneda et al, AN 1990:6697, Manufacture of fertilizers . . . materials, Mar. 1987.
Zhou, AN 1996:113523, Multi–effect fly ash fertilizer . . . method, Dec. 1994.
Nagai et al, AN 1976:134543, Improvement of the efficacy . . . soil, 1974.
Vlnaty et al, AN 115:91265, Controlled elease fertilizers . . . nutrients, Nov. 1988.

*Primary Examiner*—Wayne Langel
*Attorney, Agent, or Firm*—Emrich & Dithmar

[57] ABSTRACT

A particulate urea product having improved hardness, nonfriable and anti-caking properties and which is useful for either direct application to the soil or as an intermediate product for the subsequent incorporation with other fertilizer materials into solid bulk blends. The product consists of an admixture of urea and a finely divided inorganic material selected from the group consisting of calcium oxide, calcium hydroxide, cement and fly ash and is in particulate form, some examples of which are granules or prills.

22 Claims, No Drawings

5,782,951

PARTICULATE UREA WITH FINELY DIVIDED INORGANIC MATERIAL INCORPORATED FOR HARDNESS NONFRIABILITY AND ANTI-CAKING

TECHNICAL FIELD

This invention relates to a particulate urea product in granular or prill form having finely divided inorganic material incorporated in the granule or prill to improve the hardness, nonfriability and anti-caking characteristics of the product.

BACKGROUND OF THE INVENTION

In the fertilizer industry, urea has surpassed ammonium nitrate as the leading source of solid form nitrogen. There are a number of reasons for the preference for urea over ammonium nitrate. They include: (1) urea has a higher plant nutrient analysis over ammonium nitrate, (2) urea is classified as a nonhazardous material whereas ammonium nitrate, under certain conditions and in admixture with certain proportions of carbonaceous materials, may be an explosive compound, (3) in the off-season, urea has a number of end uses other than fertilizer, particularly animal feedstock and in certain chemical processing, and (4) there are lower costs for air pollution abatement requirements associated with urea production in contrast with that of ammonium nitrate. One drawback to the use of urea as a fertilizer in the form of granules or prills is that it is highly friable and prone to caking.

High friability is a significant restraint to the use of prilled and granular urea products. Upon physical impact, the prills or granules tend to break into smaller particles, and to produce substantial amounts of dust while being handled, transported, and applied to the intended soil environment. Particle hardness and nonfriability are important for two reasons. Firstly, urea products are often used in bulk blend fertilizer products. In those products, it is important that there be a predetermined, closely-sized range of granules to avoid unwanted segregation of the component products. If the urea product breaks into smaller particles, segregation of the urea is likely to occur. The second reason why particle hardness and nonfriability are important is to prevent the break down of prilled or granular urea products when introduced into the modern, rotating turbine-fan type field distribution equipment commonly used today. The breakdown of the granules or prills results in uneven distribution of the fertilizer from such equipment. These urea products are often shattered to such a degree that the smaller pieces fall in a shorter trajectory from the equipment and thus form a more narrow and a more concentrated swath on the soil surface than is intended and desired.

Another problem with granular or prilled urea products is caking. The tendency to cake varies depending on how the urea solution is processed into urea products. Urea products are transported, sold and used in large volumes and are thus transported and stored in bulk form. Because of the tendency for the product to cake, such storage and transportation is not feasible without additional processing considerations which add significantly to the cost of production.

In recent years, commercial fertilizer distributors and farmers recognized the superior chemical properties of the granular or prilled urea product and have accordingly made heightened demands for an improvement in the hardness and nonfriability of urea particles. This greater emphasis on particle hardness and nonfriability arises from the fact that the modern methods of handling and transportation result in more crushing of the urea particles. In addition, those involved in the handling, transportation and distribution of the urea product are making increased demands for a nondusting product. Such demands are based in large part on health and safety considerations.

In an effort to overcome these problems, a number of approaches have been developed in the chemical fertilizer industry. These approaches are discussed in the disclosure in U.S. Pat. No. 4,885,021 (Elrod) issued Dec. 5, 1989, which is incorporated herein by reference. The first approach is to surface treat the freshly prepared urea particles with any of a number of materials including diatomaceous earth and clay. While this approach improves the anti-caking characteristics of the urea product, it does not solve to any appreciable degree the friability problem. In addition, in some circumstances, the added material may incorporate foreign elements which are not compatible with the purpose for which the urea product may ultimately be used.

The second approach to solving the problems of lack of hardness, friability and caking is to incorporate into either the concentrated urea synthesis liquor solution or the anhydrous molten urea melt, conditioning agents which impart to the urea product any or all of the properties of improved hardness, nonfriability and anti-caking. The friability and caking problems as well as other problems attendant in the storage, handling and distribution of the urea product have been alleviated to a significant degree by the addition to the urea melt of low concentrations of formaldehyde. While the addition of formaldehyde helps to alleviate these problems, its use presents serious health and safety considerations. The addition of low concentrations of lignosulfonates imparts to the urea product satisfactory anti-caking and hardening characteristics but it also is fraught with certain disadvantages. In particular, lignosulfonates can discolour the urea product to an unaesthetic brownish colour, with the result that the product is not well accepted in the marketplace and therefore not commonly used in the industry.

In order to overcome such disadvantages, Elrod '021 proposes the addition of a gelling type channelized 2:1 clay such as attapulgite or sepiolite to the urea melt or the urea synthesis liquor. The resulting urea particulate demonstrates good nonfriability and anti-caking characteristics. The mechanism by which the gelling type channelized 2:1 clays improve the mechanical properties of the urea granular products is attributed in Elrod '021 to the crystalline geometry of the clays. It is there postulated that the clay needles of the channelized 2:1 clays, being about one micron in length, offer a plethora of nucleating sites or growth sites and alter the crystalline habit or structure of the urea, thereby increasing anti-caking and non-friable properties.

While the solution taught in Elrod '021 is effective to improve the physical properties of urea granules and prills, its commercial applicability depends in large part on the ready availability of large quantities of attapulgite, sepiolite or other gelling type channelized 2:1 clays, at low cost. Attapulgite, sepiolite and other such channelized 2:1 clays are relatively expensive additives for urea fertilizer products. Attapulgite clay is mined chiefly in the states of Georgia and Florida whereas sepiolite is mined chiefly in the states of California and Nevada. The locations of these mining areas can be geographically isolated from the production plants where the urea particulate is produced. As a result, the cost of transporting the days to the production plants is often substantial. As vast quantities of the attapulgite and sepiolite are required to produce the large volumes of fertilizer product being demanded and used, the initial costs and the transportation costs of such additives are a significant factor in the overall cost of the fertilizer product. Depending on the proximity of the user to the production plant, shipping costs can more than double the plant of origin cost. Accordingly, there is a need for other more widely available and less expensive additives to replace the channelized 2:1 clays disclosed in Elrod '021.

A further solution to the problems of lack of hardness, friability and caking of urea products is taught in U.S. patent application Ser. No. 08/496,769 (Aylen et al.) filed Jun. 29, 1995, which is incorporated herein by reference. That application discloses the incorporation of a finely divided mineral filler such as diatomaceous earth, sodium bentonite, calcium bentonite, kaolin, zeolite or ball clay, into a granular or prilled urea product to improve the hardness, nonfriability, and anti-caking of the product. While the colour of the products taught by application Ser. No. 08/496,769 is generally more aesthetic than the brownish colour which ligno-sulfonates impart to a urea product, some of the products are not white and therefore are not suitable for chemical processing applications. Clay granules are also not suitable for some of the industrial applications of urea products.

SUMMARY OF THE INVENTION

The present invention relates to an improved urea particulate product which incorporates a finely divided inorganic material, namely calcium oxide, calcium hydroxide, cement or fly ash, as an additive to improve the hardness, nonfriable and anti-caking properties of the product. The hardness, nonfriability and anti-caking of a granular or prilled urea product is also enhanced by incorporating a combination of an inorganic material such as calcium oxide, calcium hydroxide, cement or fly ash and finely divided clay.

The improved urea product is useful for either direct application to the soil or as an intermediate product for the subsequent incorporation with other fertilizer materials into solid bulk blends. The improved hardness, nonfriable and anti-caking characteristics render the product equal or in some cases superior to urea fertilizer granules produced by incorporation into the urea synthesis liquor of either the attapulgite or sepiolite clay disclosed in Elrod '021, the diatomaceous earth or other clays taught by U.S. application Ser. No. 08/496,769, or formaldehyde.

Finely divided powder forms of the inorganic materials are added to the urea in relatively small quantities with the result that the desired particulate properties are greatly enhanced and the urea content of the granule or prill remains high. The inorganic materials suitable for use in the present invention are typically far more widespread than attapulgite deposits. Calcium oxide, calcium hydroxide and cement are also more widespread than the clays taught by U.S. application Ser. No. 08/496,769. As a result the inorganic materials of the present invention can usually be delivered to the plant at a comparatively low cost.

It has also been discovered that the use of calcium oxide and calcium hydroxide as additives are particularly suitable for chemical processing applications. Urea product with any one of those additives is essentially white in colour which consequently attracts a good degree of acceptance in the marketplace.

Thus, in accordance with one aspect of the present invention, there is provided a particulate urea having improved hardness, nonfriable and anti-caking properties, said urea being transformed into particulate form from an admixture of urea and a finely divided inorganic material distributed therein, said inorganic material consisting of one or more members selected from the group comprising calcium oxide, calcium hydroxide, cement and fly ash.

In accordance with another aspect of the present invention, there is provided a particulate urea having improved hardness, nonfriable and anti-caking properties, said urea being transformed into particulate form from an admixture of urea, a finely divided inorganic material, said inorganic material consisting of one or more members selected from the group comprising calcium oxide, calcium hydroxide, cement and fly ash, and a finely divided mineral filler, said mineral filler consisting of one or more members selected from the group comprising diatomaceous earth, sodium bentonite, calcium bentonite, kaolin, zeolite and ball clay.

In accordance with another aspect of the present invention, there is provided a method for producing a particulate urea having improved hardness, nonfriable, and anti-caking properties comprising the steps of incorporating into a mixture a finely divided inorganic material and a molten urea melt or a urea syntheses liquor, said inorganic material consisting of one or more members selected from the group comprising calcium hydroxide, calcium oxide, cement and fly ash; and transforming said mixture into a particulate form.

In accordance with another aspect of the present invention, there is provided a method for producing a particulate urea having improved hardness, nonfriable, and anti-caking properties comprising the steps of incorporating into a mixture a finely divided inorganic material and a molten urea melt or a urea syntheses liquor, said inorganic material consisting of one or more members selected from the group comprising calcium hydroxide, calcium oxide, cement and fly ash and a finely divided mineral filler, said mineral filler comprising one or more members selected from the group comprising diatomaceous earth, sodium bentonite, calcium bentonite, kaolin, zeolite and ball clay; and transforming said mixture into a particulate form.

DETAILED DESCRIPTION OF THE INVENTION

The particulate urea product of this invention is made by incorporating finely divided inorganic materials selected from the group comprising calcium oxide, calcium hydroxide, cement and fly ash or combinations thereof into the urea synthesis liquor, either from the synthesis section or the concentration (evaporation) section, or into the particulate forming section, i.e., the molten urea melt, during the particulate urea manufacturing process. The resulting mixture is then transformed into particulate forms of urea (for example, prills, granules or pellets) by any of a number of methods presently known and practised by those skilled in the art. Only small quantities of inorganic materials are necessary to impart the desired physical properties of hardness and storage stability enabling the initial high nitrogen content of the fertilizer to be maintained. The urea product of the present invention also includes particulate urea products made by incorporating a combination of one or more of the above mentioned inorganic materials with a finely divided mineral filler such as diatomaceous earth, calcium bentonite, sodium bentonite, kaolin, zeolite and ball clay. The preferred mineral filler is a naturally occurring clay, predominantly calcium bentonite, blended with diatomaceous earth. Other suitable mineral fillers include sodium bentonite, kaolin, zeolite and ball clay, and any combination thereof.

The inorganic materials used in the present invention are commonly available. Calcium oxide and calcium hydroxide are obtained from limestone which is calcined to form calcium oxide or calcined and then hydrated to form calcium hydroxide. Limestone deposits are found in abundant supply around the world. The cement is preferably portland cement 10 or portland cement 30. Cement 10 has a typical analysis of 63.2% CaO, 21.3% $SiO_2$, 6% $Al_2O_3$, 2.7% $Fe_2O_3$, 2.9% MgO and 1.8% $SO_3$. Cement 30 has a typical analysis of 64.3% CaO, 20.4% $SiO_2$, 5.9% $Al_2O_3$, 3.1% $Fe_2O_3$, 2% MgO and 2.3% $SO_3$. Fly ash is an artificial pozzolan composed principally of amorphous silica and varying amounts of the oxides of aluminum and iron. It is produced mainly as the by-product of combustion of pulverized coal.

For purposes of determining the physical characteristics of the product of the present invention, a number of physical tests were carried out on sample granules. Fifty gram batches of molten urea melt at 275 to 285 degrees F. were treated by adding varying amounts of the finely divided inorganic material or other additive as indicated in Table 1. The urea melt and the additive were thoroughly mixed for about 2 minutes. As the additives are generally not soluble in the urea melt, mild agitation was required to maintain homogenous distribution of the material in each granule or prill of urea subsequently formed after the mixing step. The granules were then formed by spraying the molten urea mixture on a seed bed of urea in a granulation drum. The granules were continuously cycled until the particles obtained a diameter of between 1.4 and 3.6 mm. The granules were then removed from the granulation drum and screened through a number −6 to 12 Tyler Screen. Once the granules were formed and reached room temperature, they were subjected to the physical tests. The prills were formed by dropping molten urea through a prilling tower. Cool air was passed up through the tower so that as the urea dropped, prills were formed. Urea prills and urea granules without any additive were also subjected to the physical tests as controls.

The figures in Table 1 reflect results of the physical tests, namely, average crushing strength expressed in pounds, the strength as compared to urea granules without an additive, the abrasion resistance, and the percentage of breakage on impact. The calcium hydroxide, calcium oxide and cement used as additives in the products subjected to the physical tests were in powder form. The clay was a −200 mesh blend of diatomaceous earth and calcium bentonite. All of the urea particles referred to in Table 1 were in granular form with the exception of the prills tested as a control.

The strength of the granules was tested by compressing the granules in a compression tester to their breaking points. A fertilizer sample was screened to obtain a number of granules of a closely sized fraction. A chatillion compression tester was used to measure granule crushing strength. Individual granules were placed on a mounted flat surface and pressure was applied by a flat-end rod attached to the compression tester. A gauge, mounted in the compression tester, measured the pressure required to fracture the granule. At least 25 granules were tested and the average of those measurements determined the crush strength of the granules. The strength of the granules directly reflects the ability of the urea product to withstand friability and fracture during handling and storage, as well as caking during storage.

The abrasion resistance of the granules reflects the resistance of the granules to the formation of dust and fine particles as a result of granule to granule and granule to equipment contact. Abrasion resistance was tested by placing a 100 gram portion of a screened sample into a rotary drum with fifty stainless steel ball bearings 5/16 inch in diameter. The drum was closed and rotated at 30 rpm for 5 minutes. The contents were removed and hand screened over a 4.75 millimeter screen to remove the steel ball bearings and then screened over a 1.00 millimeter screen for five minutes on a Tyler portable sieve shaker. The material retained on the 1.00 millimeter screen was then weighed and a percent degradation was calculated. Abrasion resistance is indicative of anticipated material losses during handling and storage of the urea products.

Impact resistance is the resistance of granules to breakage upon impact against a hard surface. The impact resistance of the granules was tested by first obtaining a screened sample of the product by riffling the material in a Tyler sample splitter. The sample was poured down a vertical 6 inch diameter PVC pipe and fell to a metal catch pan. The total drop distance was 35 feet. The dropped samples were collected and screened over a 1.41 mm sieve. The material retained on the sieve was then weighed and a percentage of the granules which were fractured was calculated. Impact resistance is of relevance in the fertilizer industry when fan-type fertilizer spreaders are used, when urea product is discharged from overhead points into a bulk pile, and when bags of urea product are dropped during handling.

TABLE 1

| Additive | Wt % in Urea | Strength (lbs.) | Strength vs. Granular Urea with no Additives | Abrasion % | Impact % |
|---|---|---|---|---|---|
| Present Invention | | | | | |
| Ca(OH)$_2$ | 0.25 | 7.16 | 182 | 0.04 | 0.18 |
| Ca(OH)$_2$ | 0.6 | 8.18 | 208 | 0.03 | 0.1 |
| Ca(OH)$_2$ | 0.75 | 8.39 | 213 | 0.03 | 0.12 |
| Ca(OH)$_2$ | 0.6 | 6.54 | 166 | 0.05 | 0.12 |
| Ca(OH)$_2$ | 0.6 | 8.24 | 210 | 0.01 | 0.06 |
| Ca(OH)$_2$ | 2.0 | 6.75 | 172 | 0.01 | 0.0 |
| Ca(OH)$_2$ | 1.0 | 6.31 | 160 | 0.01 | 0.08 |
| CaO | 0.5 | 7.68 | 195 | 0.01 | 0.06 |
| Cement 10 | 0.25 | 6.37 | 162 | 0.08 | 0.13 |
| Cement 10 | 0.25 | 6.28 | 160 | 0.2 | 0.43 |
| Cement 30 | 0.1 | 6.32 | 161 | 0.09 | 0.14 |
| Fly Ash | 0.5 | 6.15 | 156 | 0.03 | 0.1 |
| Clay & Ca(OH)$_2$ (50/50) | 0.5 | 7.65 | 195 | 0.01 | 0.12 |
| Clay & Ca(OH)$_2$ (10/90) | 0.6 | 8.21 | 209 | 0.02 | 0.05 |
| Clay & Ca(OH)$_2$ (80/20) | 0.5 | 6.96 | 177 | 0.01 | 0.13 |
| Clay & Ca(OH)$_2$ (90/10) | 0.5 | 7.38 | 188 | 0.01 | 0.02 |
| Clay & Ca(OH)$_2$ (10/90) | 0.6 | 7.76 | 197 | 0.02 | 0.09 |
| Clay & Ca(OH)$_2$ (10/90) | 0.6 | 8.42 | 214 | 0.02 | 0.15 |
| Clay & Cement 10 (80/20) | 0.5 | 6.71 | 171 | 0.01 | 0.05 |
| Clay & Cement 10 (90/10) | 0.5 | 6.55 | 167 | 0.04 | 0.02 |
| Prior Art | | | | | |
| Formaldehyde | 0.3 | 6.09 | 156 | 0.03 | 0.1 |
| Formaldehyde | 0.6 | 6.53 | 166 | 0.08 | 0.11 |
| Formaldehyde | 0.25 | 6.37 | 162 | 0.02 | 0.02 |
| Formaldehyde | 0.3 | 4.18 | 106 | 0.02 | 0.03 |
| Formaldehyde | 0.6 | 6.54 | 166 | 0.02 | 0.06 |

TABLE 1-continued

| Additive | Wt % in Urea | Strength (lbs.) | Strength vs. Granular Urea with no Additives | Abrasion % | Impact % |
|---|---|---|---|---|---|
| hyde | | | | | |
| Urea Form-aldehyde | 0.3 | 5.42 | 138 | 0.02 | 0.03 |
| Urea Form-aldehyde | 0.3 | 5.57 | 142 | 0.06 | 0.17 |
| Urea Form-aldehyde | 0.6 | 6.89 | 175 | 0.1 | 0.05 |
| Control | | | | | |
| Urea prills | | 2.26 | 57 | | |
| Urea gran. | | 3.78 | | 0.58 | 0.67 |
| Urea gran. | | 3.58 | | 0.04 | 0.19 |
| Urea gran. | | 4.32 | | 0.02 | 0.04 |
| Urea gran. | | 4.05 | | 0.08 | 0.58 |
| Urea gran. (average) | | 3.93 | 100 | | |

From the data in Table 1, it is apparent that the samples containing the finely divided inorganic materials in accordance with the present invention yielded crushing strengths, abrasion resistance and impact resistance significantly better than those attained with untreated urea and equal to or greater than the results achieved with the urea particles to which formaldehyde had been added. The results show that commercially produced granules manufactured in accordance with the present invention would have acceptable levels of strength, abrasion and impact resistance.

Commercially available urea granules usually contain at least 46% nitrogen. Urea is generally 46.44% nitrogen. Therefore, in order to keep the nitrogen content above 46 percent, the amount of additive and/or impurities cannot exceed 0.95%. The results in Table 1 indicate that the best results were achieved with addition levels in the range of 0.1 to 2.0% by weight of the admixture, with the most preferred range being 0.25 to 0.75% by weight. The preferred range is consistent with the objective of maintaining a nitrogen content of over 46%. Some fertilizer products, for example forestry grade material which is dropped from the air, require enhanced impact resistance. In those instances, a granule with up to 2% additive may be appropriate even though the nitrogen content would be less than 46%.

Table 1 also provides results of physical tests conducted on calcium hydroxide and cement in combination with the −200 mesh clay. Calcium oxide and fly ash can be combined with clay in the same manner. The results of these tests surprisingly show that the combination of clay with either cement or calcium hydroxide imparts to the product better hardness than the addition of either cement or calcium hydroxide alone. This suggests the presence of a synergistic effect when clay is added to calcium hydroxide or cement.

The use of other inorganic materials as additives have shown unsatisfactory results when subjected to the physical tests. For example, the strength of urea granules with either lava rock or dolomite incorporated as an additive was significantly lower than the strength of urea granules to which the inorganic materials of the present invention had been added. This is surprising in view of the fact that calcium is a principal component of dolomite and that lava rock contains silica because it has been postulated that either of those two components may be responsible for the enhanced physical properties of the additives. Barite was also tested and gave poor results. Barite is a commonly used filler which has many uses common with calcium hydroxide. The results were, accordingly, somewhat surprising.

The results in Table 1 show that the hardness, nonfriability and anti-caking of the particulate urea product of this invention are equal to or superior than those of a urea product to which formaldehyde has been added. The inorganic materials used in the present invention are widely available. They offer a safe and relatively inexpensive alternative to the use of formaldehyde. In addition, urea products with calcium hydroxide, calcium oxide or cement added are essentially white in colour which render them particularly appropriate for industrial applications. Furthermore, urea granules or prills to which calcium hydroxide have been added have an exterior gloss which improves their flowability.

A further benefit of the present invention is that some of the inorganic materials contain secondary macronutrients (namely calcium, magnesium and sulfur), micronutrients (namely iron), and other elements such as silicon, all of which enhance plant growth. In recent years, there has been a growing need to include in fertilizers nutrients other than the primary nutrients of nitrogen, phosphorus and potassium. The need to supply these secondary macronutrients and micronutrients is becoming increasingly important as their natural supply in the soil becomes depleted.

Numerous modifications, variations and adaptations may be made to the particular embodiments of the invention described above without departing from the scope of the invention, which is defined in the claims.

We claim:

1. A particulate urea having improved hardness, non-friable and anti-caking properties, said urea being transformed into particulate form from an admixture of a molten urea melt or a urea synthesis liquor and a finely divided inorganic material distributed therein, said inorganic material comprising one or more members selected from the group consisting of calcium oxide, calcium hydroxide, cement and fly ash.

2. The particulate urea of claim 1 wherein said inorganic material is present in the range from about 0.1% to about 2.0% by weight of said admixture.

3. The particulate urea of claim 1 wherein said inorganic material is present in the range from about 0.25% to about 0.75% by weight of said admixture.

4. The particulate urea of claim 1, wherein said inorganic material is calcium oxide.

5. The particulate urea of claim 1, wherein said inorganic material is calcium hydroxide.

6. The particulate urea of claim 1, wherein said inorganic material is fly ash.

7. A particulate urea having improved hardness, non-friable, and anti-caking properties, said urea being transformed into particulate form from an admixture of urea, a finely divided inorganic material, said inorganic material comprising one or more members selected from the group consisting of calcium oxide, calcium hydroxide, cement and fly ash, and finely divided mineral filler, with said mineral filler comprising one or more members selected from the group consisting of diatomaceous earth, sodium bentonite, calcium bentonite, kaolin, zeolite, and ball clay.

8. The particulate of claim 7 wherein said finely divided mineral filler is a −200 mesh combination of calcium bentonite and diatomaceous earth.

9. The particulate urea of claim 7 wherein said inorganic material and said mineral filler are in combination present in the range from about 0.1% to about 2.0% by weight of said admixture.

10. A method of producing a particulate urea having improved hardness, non-friable and anti-caking properties including the steps of incorporating into a mixture a finely divided inorganic material and a molten urea melt or a urea syntheses liquor, said inorganic material comprising one or more members selected from the group consisting of calcium hydroxide, calcium oxide, cement and fly ash; and transforming said mixture into a particulate form.

11. The method of claim 10 wherein said inorganic material is present in the range from about 0.1% to about 2.0% by weight of said admixture.

12. The method of claim 10 wherein said inorganic material is present in the range from about 0.25% to about 0.75% by weight of said admixture.

13. The method of claim 10, wherein said inorganic material is calcium oxide.

14. The method of claim 10, wherein said inorganic material is calcium hydroxide.

15. The method of claim 10, wherein said inorganic material is fly ash.

16. The method of claim 10, wherein said step of transforming comprises cycling a seed of said mixture in granulation drum, spraying said mixture on said seed, and continuing said cycling until the particulate reaches the desired size.

17. A method for producing a particulate urea having improved hardness, non-friable and anti-caking properties including the steps of incorporating into a mixture a finely divided inorganic material and a molten urea melt or a urea syntheses liquor, said inorganic material comprising one or more members selected from the group consisting of calcium hydroxide, calcium oxide, cement and fly ash, and finely divided mineral filler, with said mineral filler comprising one or more members selected from the group consisting of diatomaceous earth, sodium bentonite, calcium bentonite, kaolin, zeolite and ball clay; and transforming said mixture into a particulate form.

18. The method of claim 17 wherein said finely divided mineral filler is a −200 mesh combination of calcium bentonite and diatomaceous earth.

19. The method of claim 17 wherein said inorganic material and said mineral filler are in combination present in the range from about 0.1% to about 2.0% by weight of said admixture.

20. The method of claim 17, 18 or 19 wherein said transforming comprises cycling a seed of said mixture in a granulation drum, spraying said mixture on said seed, and continuing said cycling until the particulate reaches the desired size.

21. A particulate urea having improved hardness, non-friable and anti-caking properties, said urea being transformed into particulate form from an admixture of urea and a finely divided cement distributed therein.

22. A method of producing a particulate urea having improved hardness, non-friable and anti-caking properties comprising the steps of incorporating into a mixture a finely divided cement and a molten urea melt or a urea syntheses liquor; and transforming said mixture into a particulate form.

* * * * *